United States Patent
Kazanjian et al.

(10) Patent No.: US 6,765,308 B1
(45) Date of Patent: Jul. 20, 2004

(54) HYDRO-ENERGY CONVERSION SYSTEM

(76) Inventors: Harry Kazanjian, 35330 Lone Pine La., Farmington Hills, MI (US) 48335; Margaret Kazanjian, 35330 Lone Pine La., Farmington Hills, MI (US) 48335

( * ) Notice: Subject to any disclaimer, the term of this patent is extended or adjusted under 35 U.S.C. 154(b) by 38 days.

(21) Appl. No.: 10/127,302

(22) Filed: Apr. 22, 2002

(51) Int. Cl.[7] .............................................. F03B 13/00
(52) U.S. Cl. ........................................ 290/43; 290/54
(58) Field of Search ............................. 290/43, 54, 52

(56) References Cited

U.S. PATENT DOCUMENTS

| | | | | |
|---|---|---|---|---|
| 2,276,714 A | * | 3/1942 | Brown | 415/203 |
| 4,122,381 A | * | 10/1978 | Sturm | 320/128 |
| 4,142,367 A | * | 3/1979 | Guisti | 60/325 |
| 4,246,753 A | * | 1/1981 | Redmond | 60/398 |
| 4,352,025 A | * | 9/1982 | Troyen | 290/54 |
| 4,488,055 A | * | 12/1984 | Toyama | 290/53 |
| 4,496,845 A | * | 1/1985 | Ensign et al. | 290/43 |
| 4,731,545 A | * | 3/1988 | Lerner et al. | 290/54 |
| 4,746,808 A | * | 5/1988 | Kaeser | 290/52 |
| 5,043,592 A | * | 8/1991 | Hochstrasser | 290/52 |
| 6,229,224 B1 | * | 5/2001 | Gagne | 290/1 R |
| 6,559,553 B2 | * | 5/2003 | Yumita et al. | 290/54 |

FOREIGN PATENT DOCUMENTS

| FR | 2564150 A1 | * | 11/1985 | F03B/3/02 |
|---|---|---|---|---|
| FR | 2789126 A1 | * | 8/2000 | F03G/7/04 |

* cited by examiner

Primary Examiner—Joseph Waks

(57) ABSTRACT

A hydro-energy conversion system that comprises a hydraulic turbine rotor, a turbine housing that is rotatably connected to the hydraulic turbine rotor and a turbine cover that is detachably connected to the turbine housing. A mounting flange is connected to the turbine housing. An input plumbing fitting is connected to the turbine housing. An output plumbing fitting is connected to the turbine housing. A generator is coupled to the hydraulic turbine rotor.

3 Claims, 4 Drawing Sheets

HYDRO-ENERGY CONVERSION SYSTEM

BACKGROUND OF THE INVENTION

1. Field of the Invention

The present invention relates to a hydro-energy conversion system for use in connection with electrical generators. The hydro-energy conversion system has particular utility in connection with water driven system for generating electricity.

2. Description of the Prior Art

Hydro-energy conversion systems are desirable as an alternate method for generating electrical power from the energy available in residential water systems. In many areas of the country energy limitations cause brown outs or black outs, a need was felt for a system that could generate power while water was otherwise being used to wash clothing, watering the lawn or taking a shower.

The use of electrical generators is known in the prior art. For example, U.S. Pat. No. 4,122,381 to Sturm discloses a home power station that is a generator driven by a miniature hydraulic turbine that in turn is driven by water flowing through a building. Electricity generated by the generator is stored in storage batteries for emergency use. A distribution panel is operable to give a readout of the amount of stored electricity. However, the Sturm '381 patent does not provide a hydraulic turbine housing wherein the housing includes a base flange for providing mounting of the turbine, reception plumbing fittings and deployment plumbing fittings.

Similarly, U.S. Pat. No. 4,731,545 to Lerner et al discloses a portable self-contained power conversion unit that is attached to an outlet for a pressurized fluid system such as a nozzle from a garden hose. An impeller mounted in the body of the unit and is rotated by the discharge of pressurized fluid through the unit. The rotational energy of the impeller is converted into electrical energy by a generator. However, the Lerner et al '545 patent does not provide a hydraulic turbine housing wherein the housing includes a base flange for providing mounting of the turbine, reception plumbing fittings and deployment plumbing fittings.

Lastly, U.S. Pat. No. 4,352,025 to Troyen discloses a system for generation of electrical power that is a hydro-electric generator located in the basement of a high rise building and connected in series in the clean waste water line of the building to produce electrical power in response to the flow of waste water from the building. However, the Troyen '025 patent does not provide a hydraulic turbine housing wherein the housing includes a base flange for providing mounting of the turbine, reception plumbing fittings and deployment plumbing fittings.

While the above-described devices fulfill their respective, particular objectives and requirements, the aforementioned patents do not describe a hydro-energy conversion system that allows water driven system for generating electricity. The Sturm '318, Lerner et al '545 and Troyen '025 patents makes no provision for a hydraulic turbine housing wherein the housing includes a base flange for providing mounting of the turbine, reception plumbing fittings and deployment plumbing fittings.

Therefore, a need exists for a new and improved hydro-energy conversion system that can be used for water driven system for generating electricity. In this regard, the present invention substantially fulfills this need. In this respect, the hydro-energy conversion system according to the present invention substantially departs from the conventional concepts and designs of the prior art, and in doing so provides an apparatus primarily developed for the purpose of water driven system for generating electricity.

SUMMARY OF THE INVENTION

In view of the foregoing disadvantages inherent in the known types of electrical generators now present in the prior art, the present invention provides an improved hydro-energy conversion system, and overcomes the above-mentioned disadvantages and drawbacks of the prior art. As such, the general purpose of the present invention, which will be described subsequently in greater detail, is to provide a new and improved hydro-energy conversion system and method which has all the advantages of the prior art mentioned heretofore and many novel features that result in a hydro-energy conversion system which is not anticipated, rendered obvious, suggested, or even implied by the prior art, either alone or in any combination thereof.

To attain this, the present invention essentially comprises a hydraulic turbine rotor, a turbine housing that is rotatably connected to the hydraulic turbine rotor and a turbine cover that is detachably connected to the turbine housing. A mounting flange is connected to the turbine housing. An input plumbing fitting is connected to the turbine housing. An output plumbing fitting is connected to the turbine housing. A generator is coupled to the hydraulic turbine rotor.

There has thus been outlined, rather broadly, the more important features of the invention in order that the detailed description thereof that follows may be better understood and in order that the present contribution to the art may be better appreciated.

The invention may also include turbine bushings, turbine drive shaft, thrust washers, water seals, turbine pulley, generator pulley, belt, battery pack, ac/dc power inverter, charge controller and vent. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hydro-energy conversion system that has all of the advantages of the prior art electrical generators and none of the disadvantages.

It is another object of the present invention to provide a new and improved hydro-energy conversion system that may be easily and efficiently manufactured and marketed.

An even further object of the present invention is to provide a new and improved hydro-energy conversion system that has a low cost of manufacture with regard to both materials and labor, and which accordingly is then susceptible of low prices of sale to the consuming public, thereby making such hydro-energy conversion system economically available to the buying public.

Still another object of the present invention is to provide a new hydro-energy conversion system that provides in the apparatuses and methods of the prior art some of the advantages thereof, while simultaneously overcoming some of the disadvantages normally associated therewith.

Even still another object of the present invention is to provide a hydro-energy conversion system for small-scale residential use.

Lastly, it is an object of the present invention is to provide a hydro-energy conversion system for harnessing surplus pressure energy from municipal water supply systems.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
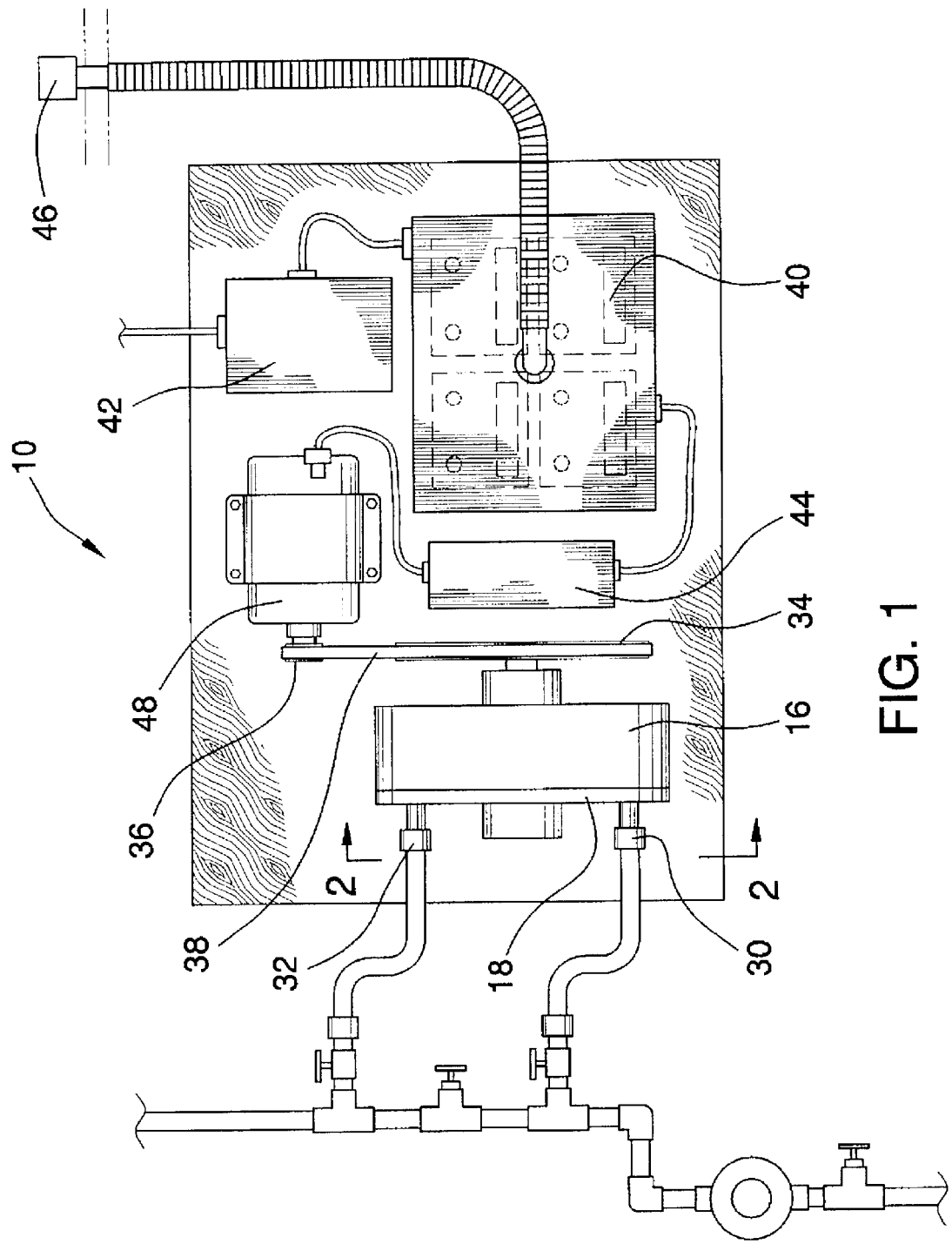
FIG. 1 is a plan view of the preferred embodiment of the hydro-energy conversion system constructed in accordance with the principles of the present invention.

Referring now to the drawings, and particularly to FIGS. 1–4, a preferred embodiment of the hydro-energy conversion system of the present invention is shown and generally designated by the reference numeral 10.

In FIG. 1, a new and improved hydro-energy conversion system 10 of the present invention for water driven system for generating electricity is illustrated and will be described. More particularly, the hydro-energy conversion system comprises a turbine housing 16. A turbine cover 18 is detachably connected to the turbine housing 16. An input plumbing fitting 30 is connected to the turbine housing 16. An output plumbing fitting 32 is connected to the turbine housing 16. A turbine pulley 34, which in the present example has a ten inch pinion is coupled to a turbine drive shaft 22 that is rotatively coupled to the turbine housing 16. A generator pulley 36 that in the present example has a two-and-one-half-inch diameter is coupled to a generator 48. A belt 38 rotatably couples the turbine pulley 34 to the generator pulley 36, the belt in the present example being a v-belt A battery pack 40 is electrically connected to the generator 48. A direct current to alternating current power inverter 42 is electrically connected to the battery pack 40. A charge controller 44 is electrically connected to the generator 48 and is electrically connected to the battery pack 40 for preventing overcharging of the battery pack 40, the battery pack in the present example being a deep cycle battery pack. A vent 46 is connected to the battery pack 40 for venting fumes.

Figure 2:
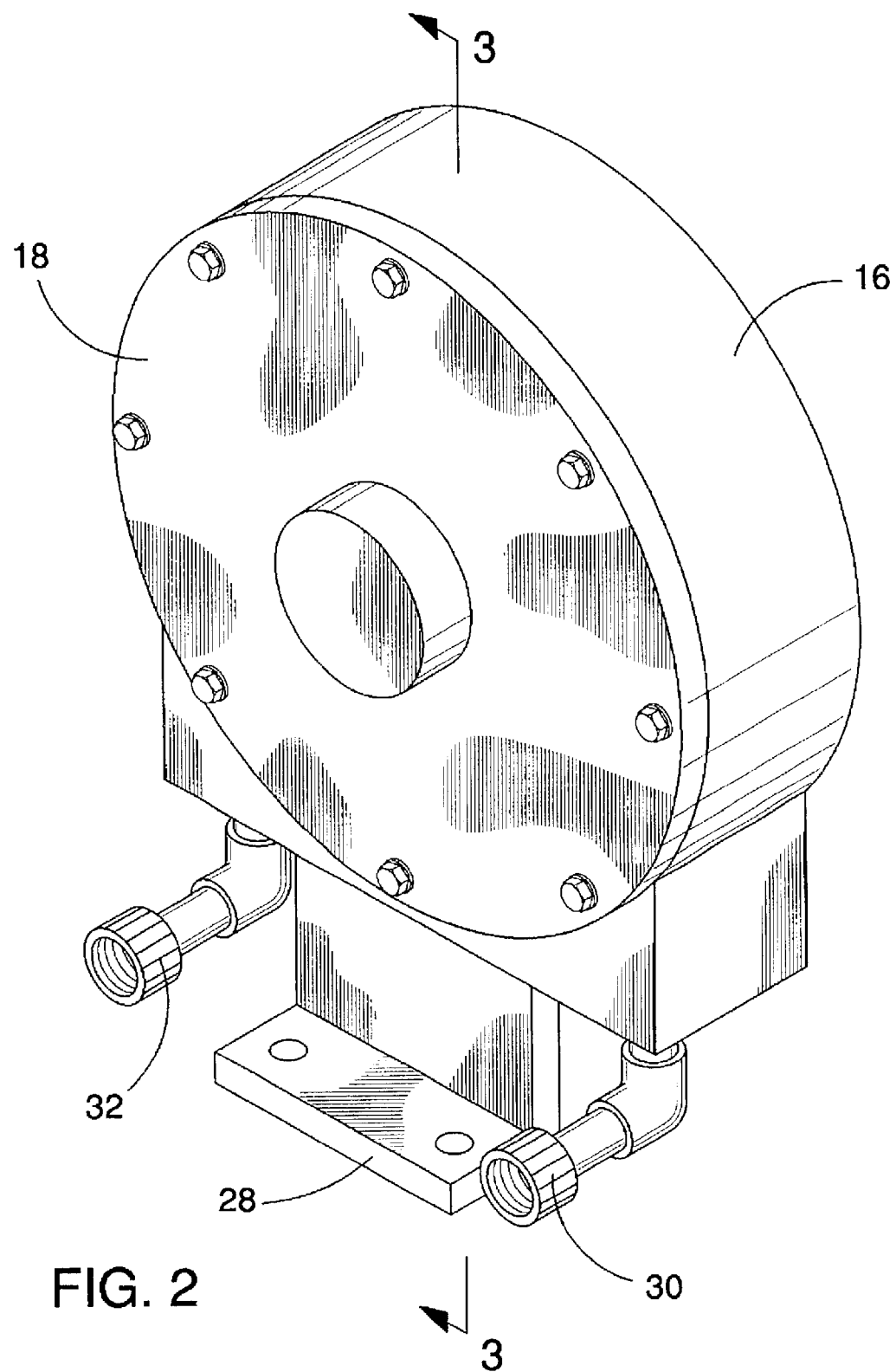
FIG. 2 is a section 2—2 view of FIG. 1 of the hydro-energy conversion system of the present invention.

In FIG. 2, hydro-energy conversion system 10 of the present invention is shown as the section view 2—2 of FIG. 1. The turbine cover 18 is detachably connected to the turbine housing 16. The mounting flange 28 is connected to the turbine housing 16. The input plumbing fitting 30 is connected to the turbine housing 16. The output plumbing fitting 32 is connected to the turbine housing 16.

Figure 3:
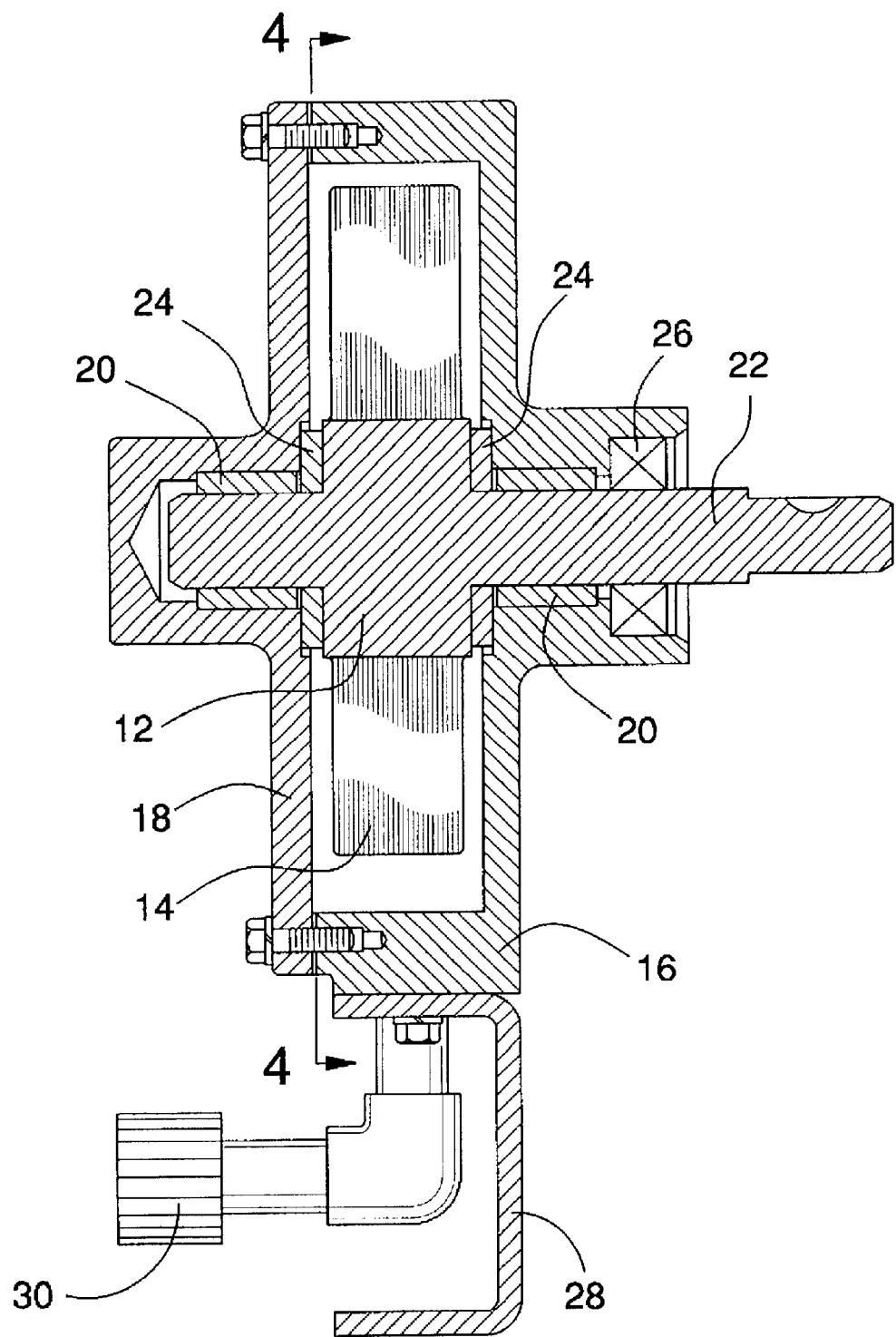
FIG. 3 is a section 3—3 view of FIG. 2 of the hydro-energy conversion system of the present invention.

In FIG. 3, hydro-energy conversion system 10 of the present invention is illustrated as the section view 3—3 of FIG. 2. A plurality of hydraulic turbine blades 14 are attached to a hydraulic turbine rotor 12. The turbine cover 18 is detachably connected to the turbine housing 16. A plurality of turbine bushings 20 is connected to the turbine housing 16. The turbine bushings 20 are connected to the turbine cover 18. The turbine drive shaft 22 is rotatably connected to the turbine bushings 20. The turbine drive shaft 22 is connected to the hydraulic turbine rotor 12. A plurality of thrust washers 24 are disposed on the turbine drive shaft 22 for maintaining clearance between the hydraulic turbine rotor 12 and the turbine housing 16, and for maintaining clearance between the hydraulic turbine blade 14 and the turbine cover 18. A water seal 26 is attached to the turbine housing 16 and is rotatably connected to the turbine drive shaft 22. The mounting flange 28 is connected to the turbine housing 16. The input plumbing fitting 30 is connected to the turbine housing 16. The output plumbing fitting 32 is connected to the turbine housing 16. The turbine in the present example being approximately twelve inches in diameter.

Figure 4:
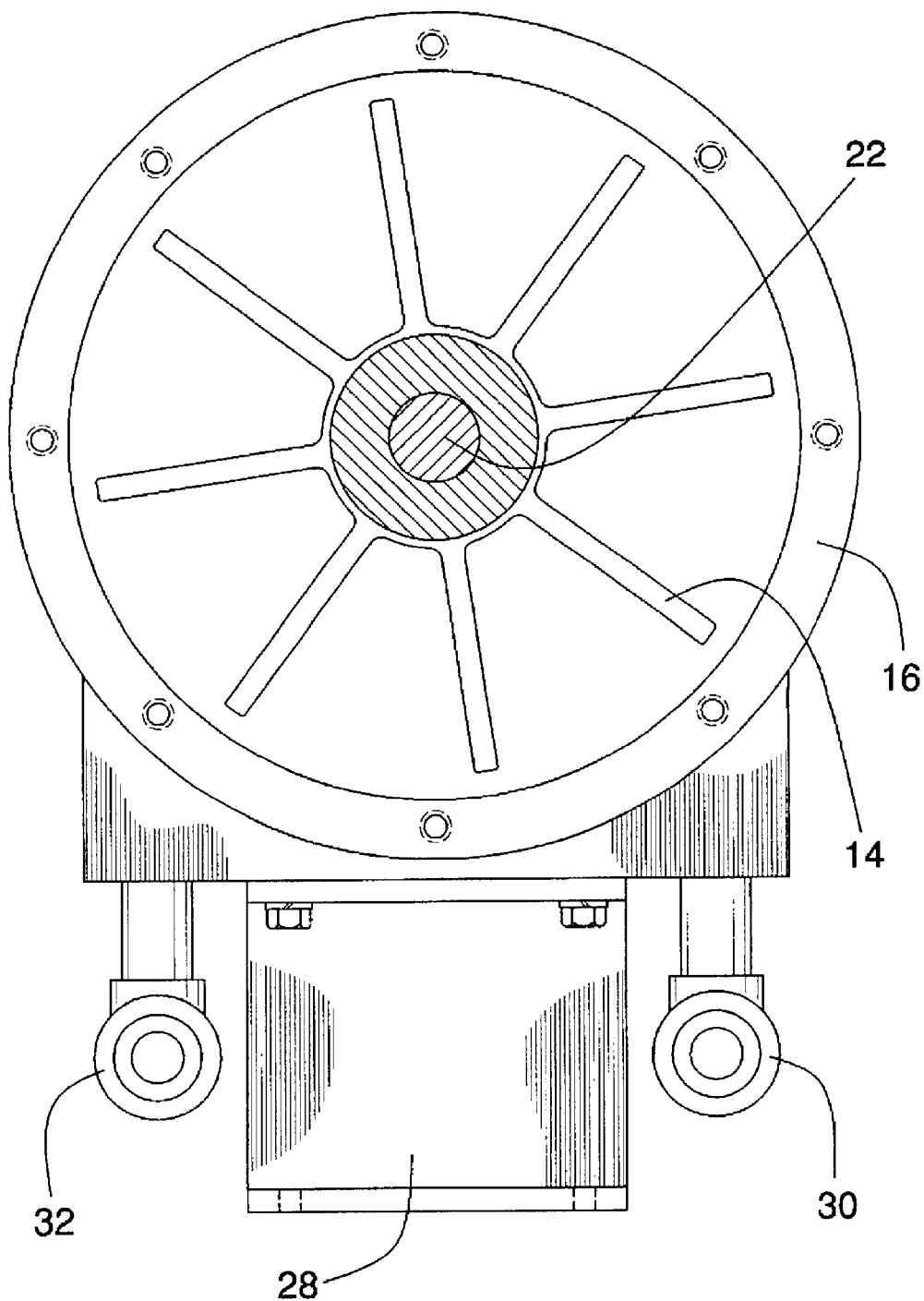
FIG. 4 is a section 4—4 view of FIG. 3 of the hydro-energy conversion system of the present invention.

In FIG. 4, hydro-energy conversion system 10 of the present invention is illustrated as the section view 4—4 of FIG. 3. The hydro-energy conversion system 10 has the hydraulic turbine rotor 12. The turbine housing 16 is rotatably connected to the hydraulic turbine rotor 12. The plurality of hydraulic turbine blades 14 are attached to the hydraulic turbine rotor 12. The mounting flange 28 is connected to the turbine housing 16. The input plumbing fitting 30 is connected to the turbine housing 16. The output plumbing fitting 32 is connected to the turbine housing 16.

In use, it can now be understood that water is routed into the input plumbing fitting 30 and out of the output plumbing fitting 32. Power is generated when the water pressure forces the hydraulic turbine blades 14 to spin, which spins the turbine pulley 34, the belt 38, the generator pulley 36 and finally the generator 48. The generator 48 charges the battery pack 40 that is discharged through an alternating current, direct current power inverter 42. The power inverter 42 supplies alternating current electrical power to a home-owner.

While a preferred embodiment of the hydro-energy conversion system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic or composite may be used instead of the metal turbine described. Also, the belt and pulley system may be directly coupled to the generator. And although water driven system for generating electricity have been described, it should be appreciated that the hydro-energy conversion system herein described is also suitable for generating electricity from waste water.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hydro-energy conversion system comprising:

a hydraulic turbine rotor;

a turbine housing rotatably connected to said hydraulic turbine rotor;

a turbine cover detachably connected to said turbine housing;

a mounting flange connected to said turbine housing;

an input plumbing fitting connected to said turbine housing;

an output plumbing fitting connected to said turbine housing;

a generator coupled to said hydraulic turbine rotor a battery pack electrically connected to said generator; and a vent connected to said battery pack for venting fumes;

a direct current to alternating current power inverter electrically connected to said generator;

a plurality of turbine bushings connected to said turbine housing, said turbine bushings connected to said turbine cover;

a turbine drive shaft rotatably connected to said turbine bushings, said turbine drive shaft connected to said hydraulic turbine rotor; and a plurality of hydraulic turbine blades attached to said hydraulic turbine rotor.

2. A hydro-energy conversion system comprising:

a hydraulic turbine rotor;

a turbine housing rotatable connected to said hydraulic turbine rotor;

a turbine cover detachably connected to said turbine housing;

a plurality of turbine bushings connected to said turbine housing, said turbine bushings connected to said turbine cover;

a turbine drive shaft rotatably connected to said turbine bushings, said turbine drive shaft connected to said hydraulic turbine rotor;

a plurality of hydraulic turbine blades attached to said hydraulic turbine rotor;

a mounting flange connected to said turbine housing;

an input plumbing fitting connected to said turbine housing;

an output plumbing fitting connected to said turbine housing;

a generator coupled to said hydraulic turbine rotor; and a direct current to alternating current power inverter electrically connected to said generator;

a plurality of thrust washers disposed on said turbine drive shaft for maintaining clearance between said hydraulic turbine rotor and said turbine housing, and between said hydraulic turbine blades and said turbine cover; and a water seal attached to said turbine housing and rotatably connected to said turbine drive shaft.

3. A hydro-energy conversion system comprising:

a hydraulic turbine rotor;

a turbine housing rotatably connected to said hydraulic turbine rotor;

a plurality of hydraulic turbine blades attached to said hydraulic turbine rotor;

a turbine cover detachably connected to said turbine housing;

a plurality of turbine bushings connected to said turbine housing; said turbine bushings connected to said turbine cover;

a turbine drive shaft rotatably connected to said turbine bushings, said turbine drive shaft connected to said hydraulic turbine rotor;

a plurality of thrust washers disposed on said turbine drive shaft for maintaining clearance between said hydraulic turbine rotor and said turbine housing, and between said hydraulic turbine blades and said turbine cover;

a water seal attached to said turbine housing and rotatably connected to said turbine drive shaft;

a mounting flange connected to said turbine housing;

an input plumbing fitting connected to said turbine housing;

an output plumbing fitting connected to said turbine housing;

a turbine pulley coupled to said turbine drive shaft;

a generator pulley coupled to said generator;

a belt rotatably coupling said turbine pulley to said generator pulley;

a battery pack electrically connected to said generator;

a direct current to alternating current power inverter electrically connected to said battery pack;

a charge controller electrically connected to said generator and electrically connected to said battery pack for preventing overcharging of said battery pack; and a vent connected to said battery pack for venting fumes.

* * * * *